US012700804B2

(12) United States Patent
Wen et al.

(10) Patent No.: US 12,700,804 B2
(45) Date of Patent: Aug. 4, 2026

(54) RIPPLE SUPPRESSION CIRCUIT AND A RIPPLE SUPPRESSION METHOD FOR QUASI-RESONANT FLYBACK POWER SUPPLY

(71) Applicant: Shenzhen Kiwi Instruments Corporation, Shenzhen (CN)

(72) Inventors: Peng Wen, Shenzhen (CN); Guanqiu Lin, Shenzhen (CN)

(73) Assignee: Shenzhen Kiwi Instruments Corporation, Shenzhen (CN)

( * ) Notice: Subject to any disclaimer, the term of this patent is extended or adjusted under 35 U.S.C. 154(b) by 191 days.

(21) Appl. No.: 18/438,198

(22) Filed: Feb. 9, 2024

(65) Prior Publication Data

US 2024/0186904 A1     Jun. 6, 2024

(30) Foreign Application Priority Data

Feb. 10, 2023     (CN) .......................... 202310094122.0

(51) Int. Cl.
| | |
|---|---|
| *H02M 3/335* | (2006.01) |
| *H02M 1/14* | (2006.01) |
| *H02M 1/15* | (2006.01) |

(52) U.S. Cl.
CPC ....... *H02M 3/33507* (2013.01); *H02M 1/143* (2013.01); *H02M 1/15* (2013.01)

(58) Field of Classification Search
CPC .... H02M 3/33507; H02M 1/143; H02M 1/15; H02M 1/44; H02M 3/33523; H02M 1/0025; H02M 1/14; H02M 1/0009; Y02B 70/10
See application file for complete search history.

(56) References Cited

U.S. PATENT DOCUMENTS

| | | | | |
|---|---|---|---|---|
| 9,312,775 | B2 * | 4/2016 | Telefus | .............. H02M 3/33523 |
| 9,350,341 | B2 * | 5/2016 | Lee | ..................... H03K 17/165 |
| 10,141,838 | B2 * | 11/2018 | Zhang | ............... H02M 3/33523 |
| 10,148,186 | B2 * | 12/2018 | Gao | ................... H05B 45/3725 |
| 10,291,113 | B2 * | 5/2019 | Lin | ..................... H02M 3/3353 |

(Continued)

FOREIGN PATENT DOCUMENTS

| | | |
|---|---|---|
| CN | 108539967 A | 9/2018 |
| CN | 109921621 A | 6/2019 |

*Primary Examiner* — Yusef A Ahmed

(74) *Attorney, Agent, or Firm* — MUNCY, GEISSLER, OLDS & LOWE, P.C.

(57)     ABSTRACT

A ripple suppression circuit and a ripple suppression method for quasi-resonant flyback power supply. The ripple suppression circuit includes a compensation circuit and a control circuit, the compensation circuit configured to generate a compensation signal based on bus voltage, and the control circuit configured to compare a first signal and a second signal to provide a first control signal to control the power switch of the quasi-resonant flyback power supply turning from the on state to the off state. Wherein the first signal is compensated by the compensating signal. Compared with traditional power switch control mode of quasi-resonant flyback power supply, the ripple suppression circuit takes the bus voltage as a part of the first signal, and compares the first signal with the second signal, then controls the status of the power switch according to the comparison result.

4 Claims, 7 Drawing Sheets

(56)                References Cited

U.S. PATENT DOCUMENTS

| | | | | | |
|---|---|---|---|---|---|
| 2012/0243270 A1* | 9/2012 | Ye | | | H02M 3/33507 363/21.14 |
| 2013/0051090 A1* | 2/2013 | Xie | | | H05B 45/3725 363/21.17 |
| 2013/0070379 A1* | 3/2013 | Pan | | | H02H 3/093 361/87 |
| 2013/0100715 A1* | 4/2013 | Lin | | | H02M 1/44 363/21.17 |
| 2014/0022824 A1* | 1/2014 | Huang | | | H02M 3/33523 363/21.12 |
| 2014/0198540 A1* | 7/2014 | Xu | | | H02M 3/33523 363/21.12 |
| 2016/0156259 A1* | 6/2016 | Zhang | | | H02M 3/33523 363/21.12 |
| 2016/0172981 A1* | 6/2016 | Gritti | | | H02M 1/4241 363/21.12 |
| 2016/0261199 A1* | 9/2016 | Adragna | | | H02M 1/42 |
| 2016/0276936 A1* | 9/2016 | Gritti | | | H02M 1/4258 |
| 2016/0336861 A1* | 11/2016 | Gritti | | | H02M 3/33523 |
| 2017/0179833 A1* | 6/2017 | Adragna | | | H02M 3/335 |
| 2017/0214318 A1* | 7/2017 | Takenaka | | | H02M 3/1584 |
| 2018/0007751 A1* | 1/2018 | Gritti | | | H05B 45/385 |
| 2019/0028033 A1* | 1/2019 | Tang | | | H02M 3/33553 |
| 2019/0116637 A1* | 4/2019 | Wang | | | H05B 45/385 |
| 2020/0036290 A1* | 1/2020 | Yang | | | H02M 3/24 |
| 2021/0006147 A1* | 1/2021 | Feldtkeller | | | H02M 1/083 |
| 2021/0152074 A1* | 5/2021 | Yu | | | H03K 17/162 |
| 2021/0211048 A1* | 7/2021 | Yu | | | H02M 1/0029 |
| 2021/0328500 A1* | 10/2021 | Lu | | | H02M 1/0025 |
| 2022/0200462 A1* | 6/2022 | Wang | | | H02M 3/33561 |
| 2022/0255438 A1* | 8/2022 | Chen | | | H02M 1/0025 |
| 2022/0255439 A1* | 8/2022 | Chen | | | H02M 1/0025 |
| 2022/0399818 A1* | 12/2022 | Zhao | | | H02M 1/44 |
| 2024/0128881 A1* | 4/2024 | Yu | | | H02M 3/33523 |

* cited by examiner

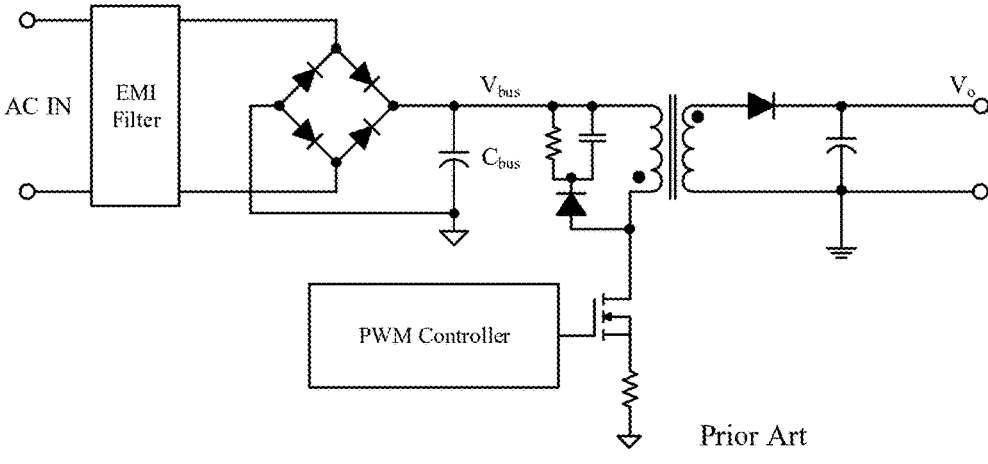
Prior Art
Fig.1
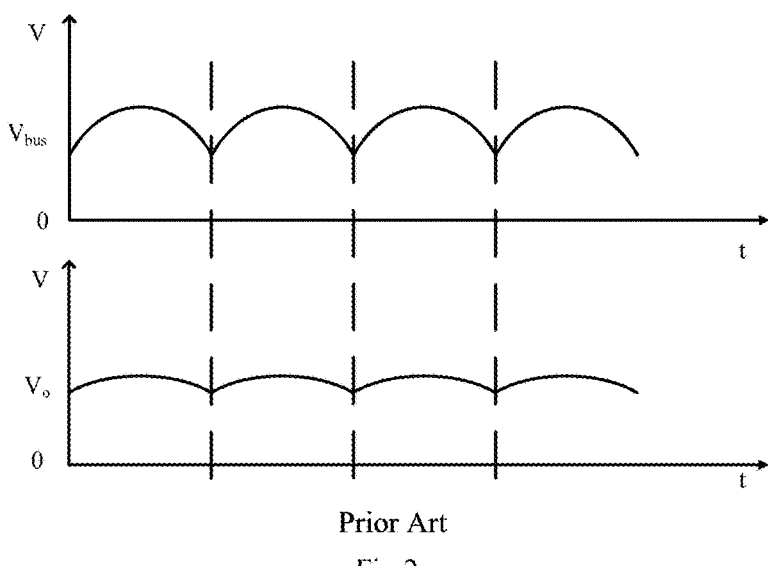
Prior Art
Fig.2
Prior Art
Fig.3

RIPPLE SUPPRESSION CIRCUIT AND A RIPPLE SUPPRESSION METHOD FOR QUASI-RESONANT FLYBACK POWER SUPPLY

CROSS-REFERENCE TO RELATED APPLICATIONS

This application claims priority to and the benefit of Chinese Patent Applications No. 202310094122.0, filed on Feb. 10, 2023, which are incorporated herein by reference in its entirety.

TECHNICAL FIELD

This application relates to the power electronics technical field, in particular but not limited to a ripple suppression circuit and a ripple suppression method for quasi-resonant flyback power supply.

BACKGROUND

FIG. 1 shows a flyback isolated power supply. The AC voltage is rectified and filtered, when the AC voltage is higher than the capacitor voltage, the capacitor Cbus starts charging, and when the AC voltage is lower than the capacitor voltage, the capacitor Cbus starts discharging. The bus voltage Vbus is shown in FIG. 2. Although the capacitor Cbus compensates the declining trend of AC voltage to a certain extent, and reduces the pulsation degree of AC voltage, it still fluctuates, showing significant power frequency ripple.

A control loop of the flyback isolated power supply can be represented by the block diagram in FIG. 3. The fluctuation of Vbus is equivalent to the disturbance to the system, which will produce corresponding ripple on the controlled object Vo. Most flyback power systems have limited loop gain, so voltage fluctuation on the capacitor Cbus will result in appreciable ripples. As shown in FIG. 2, the ripple shape of the output voltage Vo is similar to that of the bus voltage Vbus.

In theory, when the flyback isolated power supply works, the output voltage Vo is unchanged under the condition of constant load. However, due to influence of the capacitor Cbus, the output voltage Vo fluctuates, which reduces the efficiency of flyback isolation power supply, and also affects the output quality of output voltage Vo.

In view of this, it is necessary to provide a new structure or control method for solving at least some of the above problems.

SUMMARY

In view of one or more problems in the prior art, a ripple suppression circuit and a ripple suppression method for quasi-resonant flyback power supply is provided in the present application.

An embodiment of the present application discloses a ripple suppression circuit for quasi-resonant flyback power supply, the ripple suppression circuit comprising:
  a compensation circuit, configured to generate a compensation signal, wherein the compensation signal is generated based on bus voltage; and
  a control circuit, configured to compare a first signal with a second signal to provide a first control signal, wherein the control signal is configured to control the power switch of the quasi-resonant flyback power supply turning from on state to off state, and the first signal is compensated by the compensation signal.

Another embodiment of the present application discloses a ripple suppression method for quasi-resonant flyback power supply, the ripple suppression method comprising:
  generating a compensation signal, wherein the compensation signal is generated based on bus voltage; and
  comparing a first signal with a second signal to provide a first control signal, wherein the control signal is configured to control the power switch of the quasi-resonant flyback power supply turning from on state to off state, and the first signal is compensated by the compensation signal.

BRIEF DESCRIPTION OF THE DRAWINGS

The above aspects and implementation forms of the present application will be explained in the following description of specific embodiments in relation to the enclosed drawings, in which
FIG. 1 shows a flyback isolation power supply structure diagram;
FIG. 2 shows the sequence diagram of the bus voltage and the output voltage of the flyback isolation power supply;
FIG. 3 shows the control loop schematic diagram of the flyback isolation power supply.

LABEL DESCRIPTION

Figure 4:
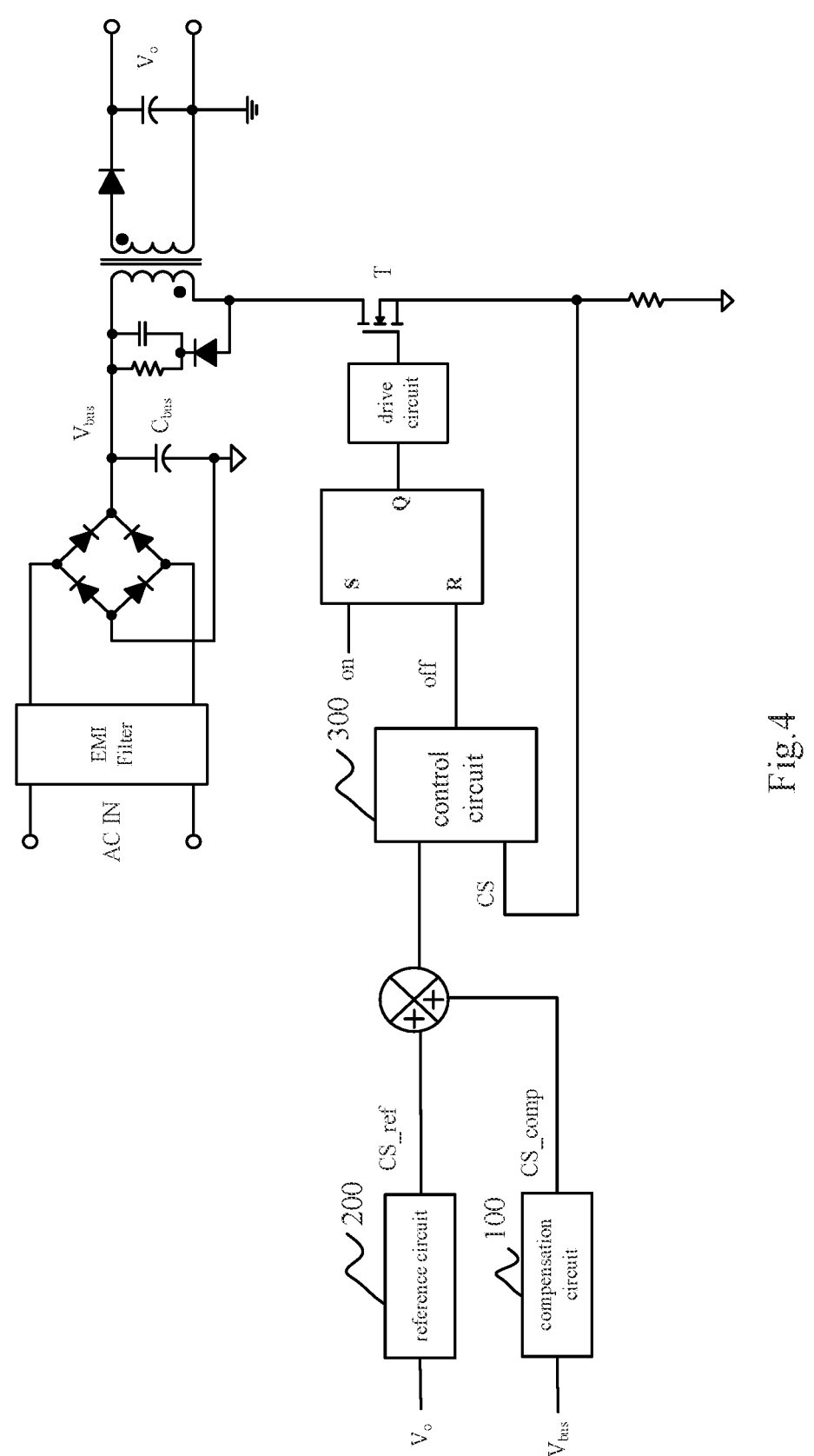
FIG. 4 shows a schematic diagram of an output suppression circuit according to an embodiment of the present application.

100, compensation circuit; 200, reference circuit; 300, control circuit; 310, addition circuit; 320, comparison circuit; 330, subtraction circuit.

DETAILED DESCRIPTION

In order to further understand the present application, the following describes the preferred implementation scheme of the application in combination with embodiments, but it should be understood that these descriptions only for further illustrate the features and advantages of the present application, rather than limit the claims of the present application.

The descriptions in this section is only for a few typical embodiments, and the present application is not limited to the scope of the description of the embodiments. Combinations of different embodiments, replacement of some technical features in different embodiments, and replacement of same or similar prior art means with some technical features in the embodiments are also within the scope of description and protection of the present application.

"Coupling" or "connection" in the specification includes both direct connection and indirect connection. Indirect connection is a connection through an intermediate medium, such as a connection through an electrically conductive medium such as a conductor, wherein the electrically conductive medium may contain parasitic inductance or parasitic capacitance, and may also be connected through an intermediate circuit or component described in the embodiments in the specification; indirect connections may also include connections through other active or passive devices on the basis of which the same or similar functions can be achieved, such as connections through switches, signal amplifiers, follower circuits and other circuits or components. "Multiple" or "many" means two or more. In addition, in the present application, terms such as first and second are used primarily to distinguish one technical feature from another and do not necessarily require or imply an actual relationship or sequence between these technical features.

When the flyback isolation power supply operates in quasi-resonant mode, an approximate equation is as follows:

$$Io \approx \frac{1}{2} \cdot N_{ps} \cdot I_{pk} \cdot \frac{\dfrac{1}{N_{ps} \cdot (V_o + V_F)}}{\dfrac{1}{V_{bus}} + \dfrac{1}{N_{ps} \cdot (V_o + V_F)}}$$

In the equation, Io is the output current of the flyback isolation power supply Nps is the transformer turn ratio, Ipk is the peak current on the primary side of the transformer, Vo is the output voltage of the flyback isolation power supply, and VF is the output diode voltage drop. For applications with constant voltage output, the purpose of the control loop is to keep the output power unchanged, that is, the output voltage Vo and the output current Io are unchanged. When the bus voltage Vbus fluctuates, the peak current Ipk on the primary side of the transformer must be adjusted accordingly to maintain the output power unchanged. As can be seen from the above equation, if Ipk=1/Vbus+1/Nps/(Vo+VF), the influence of the bus voltage Vbus fluctuation on the output power can be eliminated.

FIG. 4 shows a structural diagram of an output suppression circuit for a quasi-resonant flyback power supply provided by an embodiment of the application. When the flip-flop receives a second control signal on, the power switch T is on state. At this time, the bus voltage Vbus supplies power to the primary coil, the energy is continuously stored in the primary coil of the transformer, and the transformer current rises linearly. Sampling current on the primary side of the transformer through non-inductive resistance, obtaining a sampling signal CS of the transformer, the sampling signal CS is sent to the control circuit 300, and compared with sum of a compensation signal CS_comp and a reference signal CS_ref. When the sampling signal CS is greater than the sum signal, the control circuit 300 outputs a first control signal off, then the flip-flop generating a reset signal, controlling the power switch T turning from on state to off state. When the power switch T is off state, the bus voltage Vbus stops supplying power to the primary coil. At this time, the energy stored in the primary coil also needs to supply energy to loads, and the transformer current will becomes smaller. Therefore, the moment when the power switch T is turning on to off is the moment when the current on the primary side of the transformer is maximum. When the current on the primary side of the transformer reaches 1/Vbus+1/Nps/(Vo+VF), the power switch T can be turned off to meet the above formula Ipk=1/Vbus+1/Nps/(Vo+VF).

wherein, 1/Vbus can be obtained by sampling the bus voltage, and 1/Nps/(Vo+VF) can be obtained by sampling the output voltage.

Figure 5:
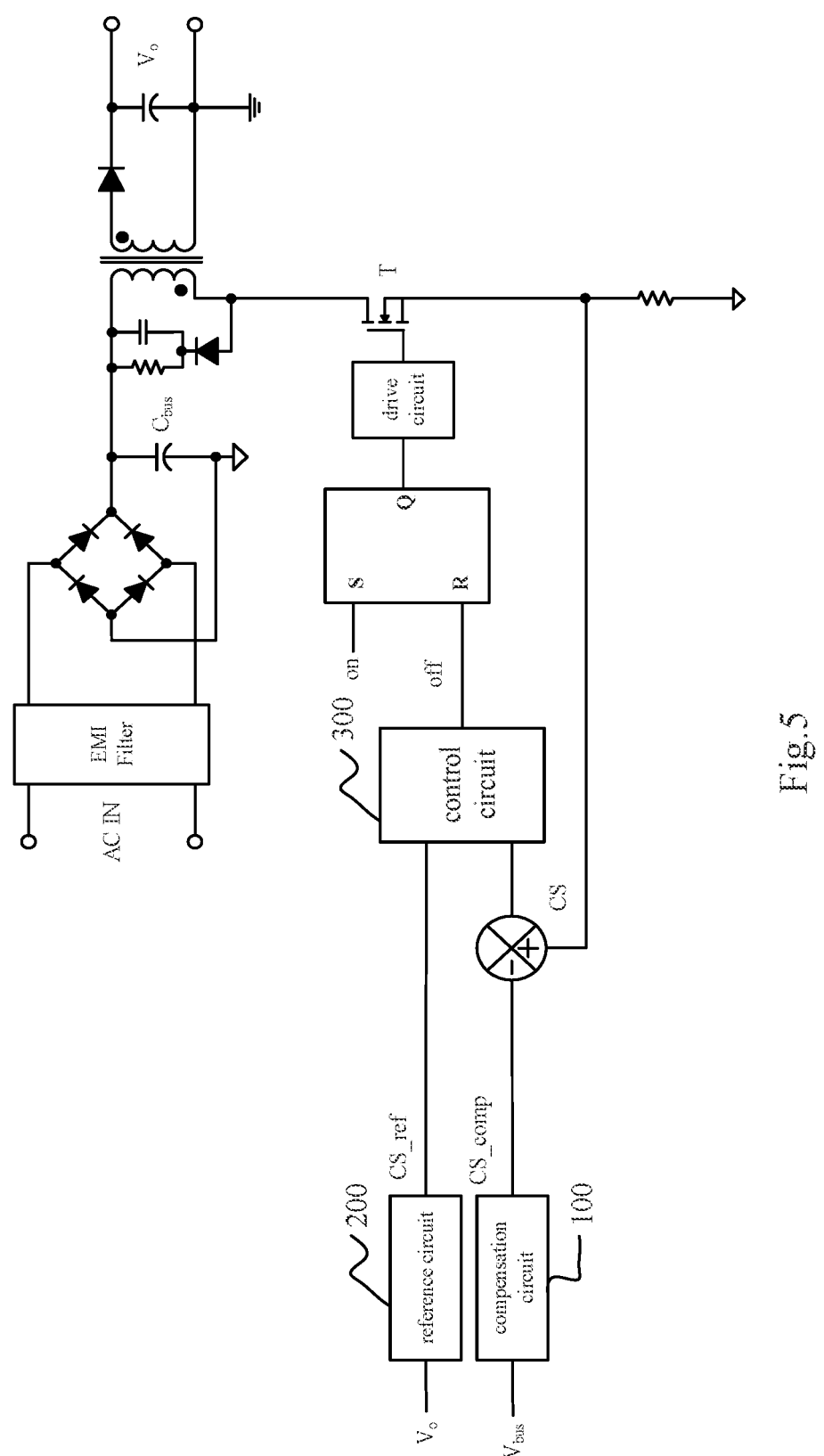
FIG. 5 shows a schematic diagram of an output suppression circuit according to another embodiment of the present application.

In the structure diagram of another output suppression circuit, refer to FIG. 5, Since the formula Ipk=1/Vbus+1/Nps/(Vo+VF) is equivalent to a formula Ipk−1/Vbus=1/Nps/(Vo+VF), the compensation signal CS_comp representing the bus voltage, can also be compensated into the transformer sampling signal CS, and compared with the reference signal CS_ref, When the sampling signal CS of the transformer subtract the compensation signal CS_comp is greater than the reference signal CS_ref, the control circuit 300 outputs the first control signal off, controlling the power switch T off. The ripple of the output suppression circuit can also be suppressed.

Therefore, to suppress the ripple, the compensation circuit 100, the reference circuit 200 and the control circuit 300 are required. wherein The compensation circuit 100 has an input terminal and an output terminal, the input terminal of the compensation circuit 100 configured to receive a circuit signal representing the bus voltage Vbus; the reference circuit 200 has an input terminal and an output terminal, the input terminal of the reference circuit 200 configured to receive a circuit signal representing the output voltage Vo; The control circuit 300 has a first input terminal, a second input terminal and an output terminal, the first input terminal of the control circuit 300 configured to receive a first signal, wherein the first signal is compensated by the compensation signal CS_comp, the second input terminal of the control circuit 300 configured to receive a second signal. The control circuit 300 compares the first signal and the second signal, and determines whether to output the first control signal off according to the comparison result.

Figure 6:
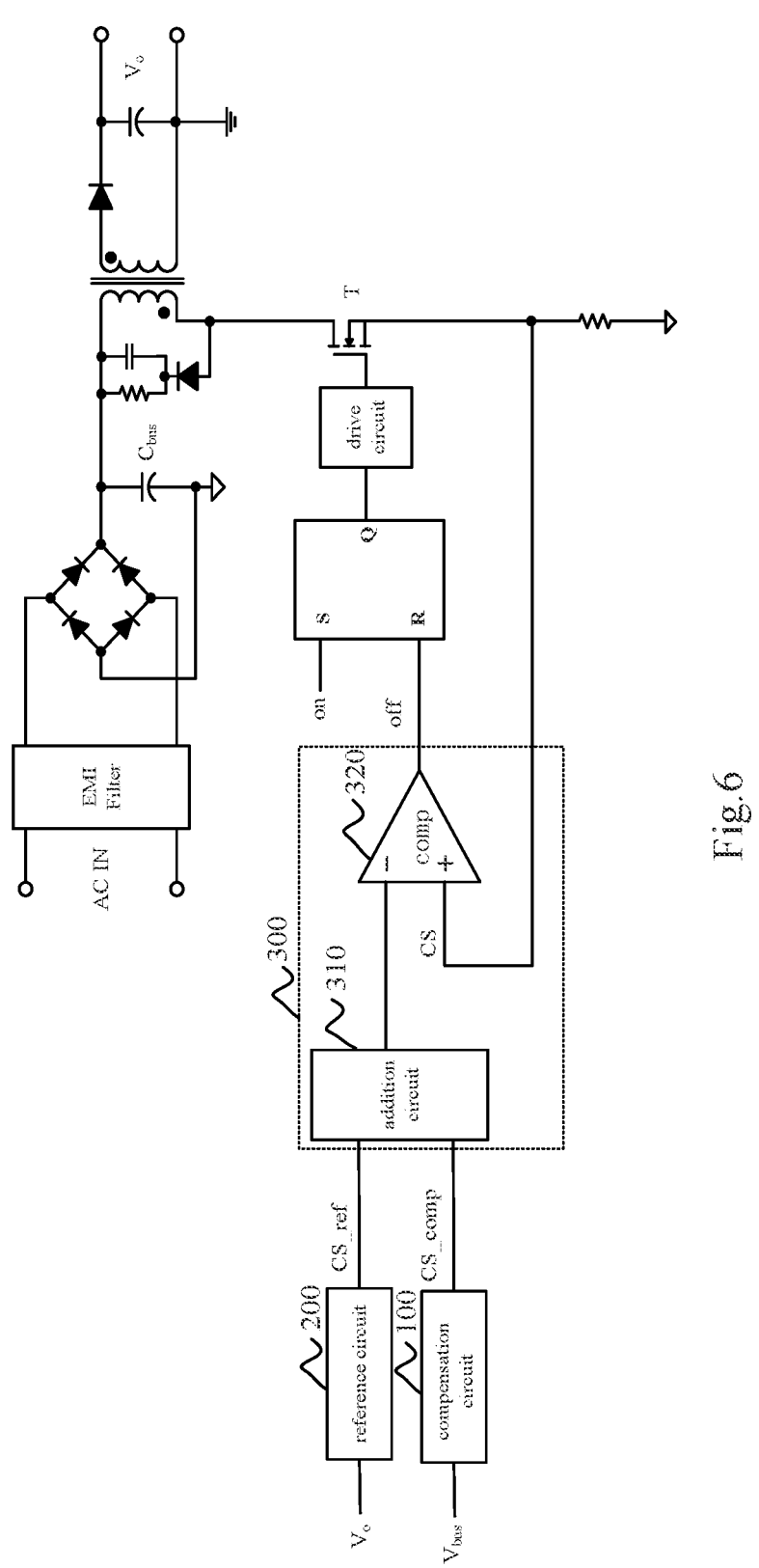
FIG. 6 shows a schematic diagram of a control circuit according to an embodiment of the present application.

In one embodiment, refer to FIG. 6, the first signal represents the reference signal add the compensation signal, and the second signal represents the current on the primary side of the transformer. The control circuit 300 comprises an addition circuit 310 and a comparison circuit 320, wherein the addition circuit 310 has a first input terminal, a second input terminal and an output terminal, the first input terminal of the addition circuit 310 coupled to the compensation circuit 100, the second input terminal of the addition circuit 310 coupled to the reference circuit 200. The addition circuit 310 is configured to generate a sum signal of the reference signal CS_ref and the compensation signal CS_comp. The comparison circuit 320 has a first input terminal and a second input terminal, the first input terminal of the comparison circuit 320 configured to receive the transformer sampling signal CS, the second input terminal of the comparison circuit 320 coupled to the output terminal of the addition circuit 310. The comparison circuit 320 is configured to compare the transformer sampling signal CS and the sum signal. when the transformer sampling signal CS is greater than the sum signal, the control circuit 300 outputs the first control signal off.

Figure 7:
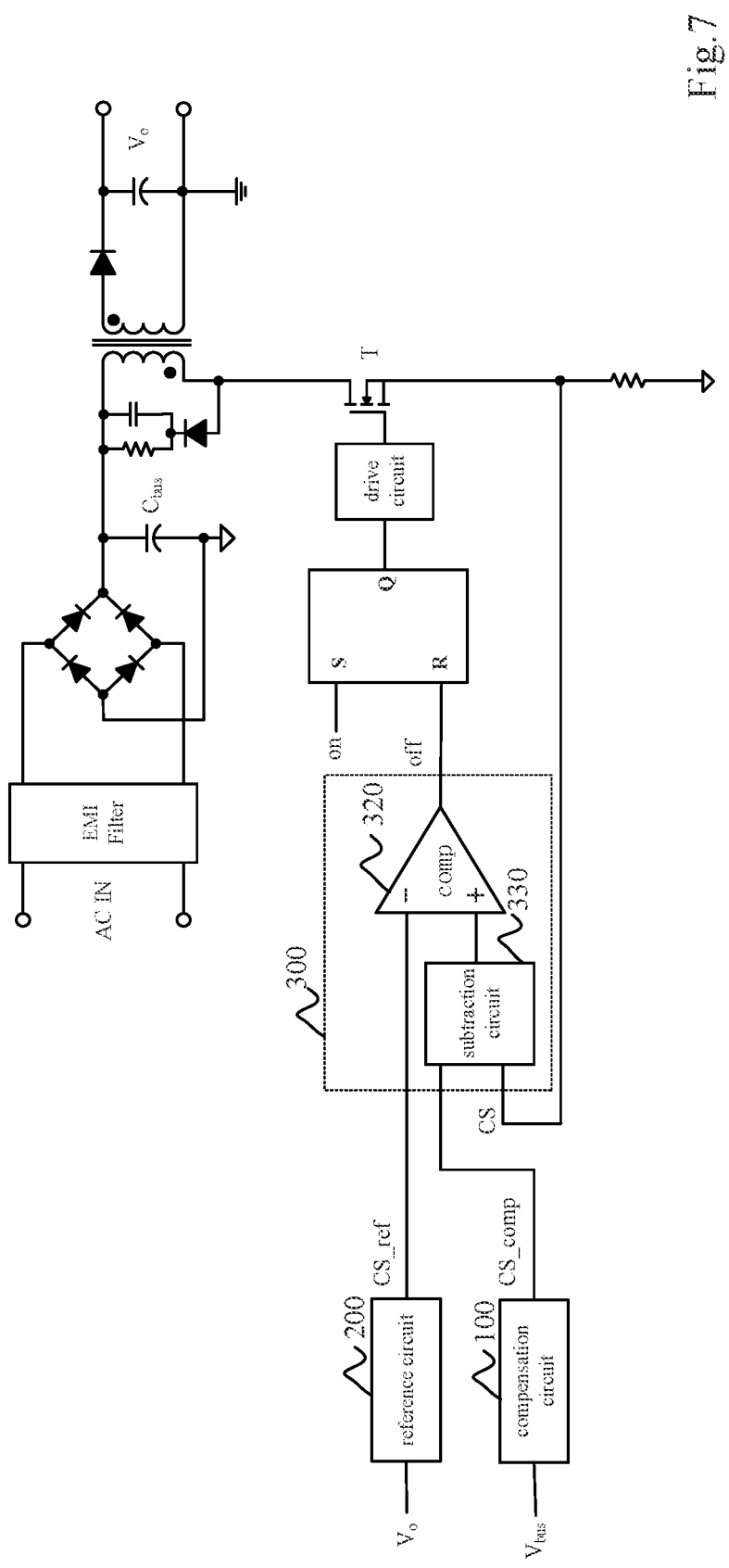
FIG. 7 shows a schematic diagram of a control circuit according to another embodiment of the present application.

In one embodiment, refer to FIG. 7, the first signal represents the primary side current of the transformer subtract the compensation signal, and the second signal represents the reference signal. The control circuit 300 comprises a subtraction circuit 330 and a comparison circuit 320, wherein the subtraction circuit 330 has a first input terminal, a second input terminal and an output terminal, the first input terminal of the subtraction circuit 330 coupled to the output terminal of the compensation circuit 100, the second input terminal of the subtraction circuit 330 coupled to the output terminal of the reference circuit 200. The subtraction circuit 330 is configured to generate a subtraction signal of the transformer sampling signal CS and the compensating signal CS_comp. The comparison circuit 320 has a first input terminal and a second input terminal, the first input terminal of the comparison circuit 320 coupled to the output terminal of the subtraction circuit 330, the second input terminal of the comparison circuit 320 configured to receive the reference signal CS_ref. The comparison circuit 320 is configured to compare the subtraction signal with the reference signal CS_ref. when the subtraction signal is greater than the reference signal CS_ref, the control circuit 300 outputs the first control signal off.

Specifically, in a feasible embodiment, the compensation signal CS_comp takes 1/Vbus, the reference signal CS_ref takes 1/Nps/(Vo+VF), when the transformer current reaches 1/Vbus+1/Nps/(Vo+VF), controlling the power switch T off, the ripple can be suppressed.

Considering that when sampling the bus voltage Vbus, sometimes the voltage divided by the resistor, or the gain performed by an operation circuit, the sampling signal is a linear relationship with the bus voltage Vbus, and is not exactly equal. Therefore, the relation between the compensation signal CS_comp and the bus voltage Vbus is as follows: CS_comp=k0+k1/Vbus, wherein k0 is a constant and k1 is a non-zero constant. Similarly, the reference signal CS_ref also has a linear relationship with the output voltage Vo. In particular, during the operation of the quasi-resonant flyback power supply, the transformer turn ratio Nps and the output diode voltage drop VF are constant, when the load is unchanged, the output voltage Vo is always unchanged, so the reference signal CS_ref representing the output voltage is also always unchanged. In the case of low precision requirements, a voltage value can also be preset to represent the reference signal CS_ref.

Figure 8:
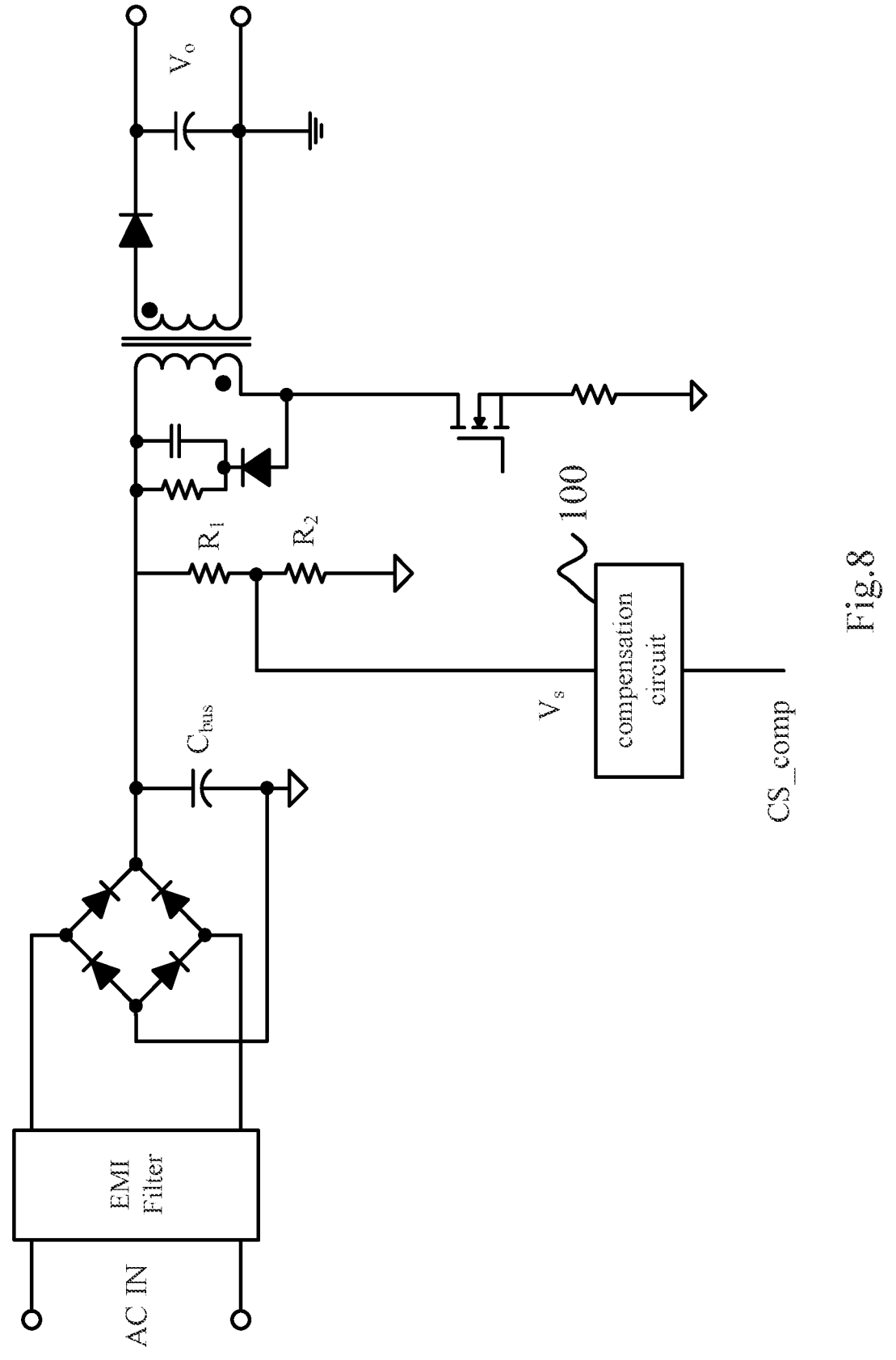
FIG. 8 shows a schematic diagram of a first sampling circuit according to an embodiment of the present application.

The bus voltage Vbus is sampled by a first sampling circuit, In one embodiment, the first sampling circuit acquires a voltage signal representing the bus voltage Vbus through a resistance divider circuit. Specifically, as shown in FIG. 8, the resistor divider circuit comprises a first resistor R1 and a second resistor R2, wherein the first resistor R1 has a first terminal and a second terminal, the first terminal of the first resistor R1 coupled to a capacitor Cbus; and the second resistor R2 has a first terminal and a second terminal, the first terminal of the second resistor R2 coupled to the second terminal of the first resistor R1, the second terminal of the second resistor R2 coupled to ground. Therefore, the relationship between the sampling voltage Vs of the bus voltage and the bus voltage Vbus is as follows: Vs=R2/(R1+R2)*Vbus.

Figure 9:
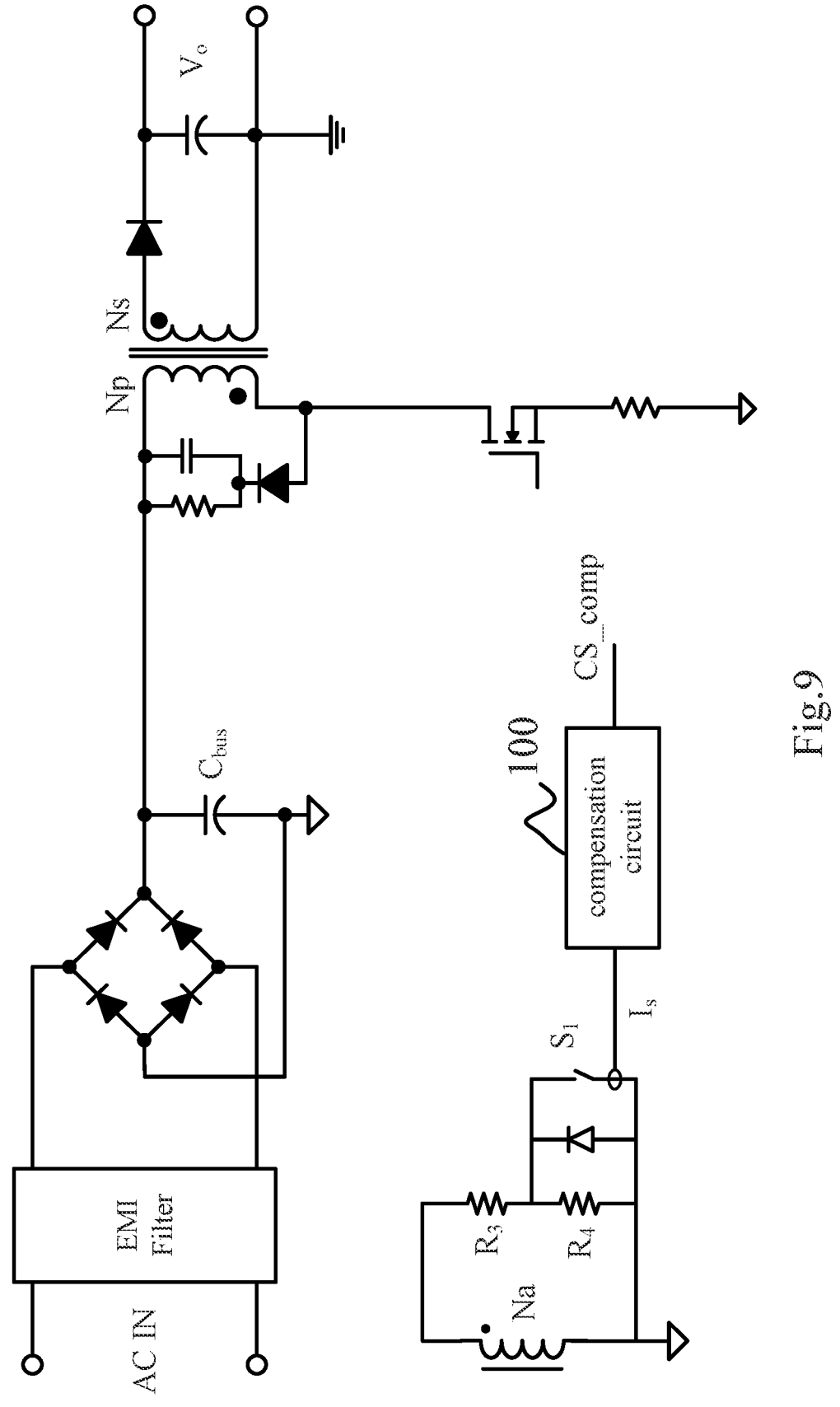
FIG. 9 shows a schematic diagram of a first sampling circuit according to another embodiment of the present application.

In another embodiment, as shown in FIG. 9, the first sampling circuit comprises an auxiliary winding Na, a third resistor R3, a fourth resistor R4, and a current acquisition circuit. wherein the auxiliary winding Na has a first terminal and a tail terminal, the tail terminal of the auxiliary winding Na coupled to ground; and the third resistor R3 has a first terminal and a second terminal, the first terminal of the third resistor R3 coupled to the first terminal of the auxiliary winding Na; and the fourth resistor R4 has a first terminal and a second terminal, the first terminal of the fourth resistor R4 coupled to the second terminal of the third resistor R3, the second terminal of the fourth resistor R4 coupled to ground; and the current acquisition circuit has a first terminal and a second terminal, the first terminal of the current acquisition circuit coupled to the first terminal of the fourth resistor R4, the second terminal of the current acquisition circuit coupled to ground. The current acquisition circuit is configured to obtain the current signal representing the bus voltage Vbus by collecting the current flowing through the third resistor R3. PK In a particular phase of quasi-resonant flyback power supply operation, the current flowing through the third resistor R3 is linearly related to the bus voltage. In a feasible embodiment, the first sampling circuit also comprises a diode D1 and a switch S1, wherein the diode D1 has an anode and a cathode, the anode of the diode D1 coupled to a second terminal of the third resistor R3, the cathode of the diode D1 coupled to ground; and the switch S1 has a first terminal and a second terminal, the first terminal of the switch S1 coupled to the second terminal of the third resistor R3, the second terminal of the switch S1 coupled to ground. Therefore, the relation between the sampling current Is and the bus voltage Vbus Is as follows: Is=Vbus*Na/Np*1/R3, wherein Na is the number of turns in the auxiliary winding and Np is the number of turns in the primary winding.

The output voltage Vo is sampled through the primary winding (primary side feedback control) or the secondary winding (secondary side feedback control). Specifically, the primary side feedback control saves cost and PCB layout space, while the secondary side feedback control has higher feedback accuracy, and the output voltage Vo can be sampled through the primary winding or the secondary winding according to the actual needs.

In addition, the application also discloses a ripple suppression method for a quasi-resonant flyback power supply, comprising the following steps:

generating a compensation signal, wherein the compensation signal is generated based on bus voltage; and comparing a first signal with a second signal to provide a first control signal, wherein the control signal is configured to control the power switch of the quasi-resonant flyback power supply turning from on state to off state, and the first signal is compensated by the compensation signal.

Specifically, wherein the relation between the compensation signal and the bus voltage is: CS_comp=K0+K1/Vbus; wherein CS_comp is the compensation signal, K0 is a constant, K1 is a non-zero constant, and Vbus is the bus voltage. The principle of ripple suppression in this embodiment can be referred to the description of the ripple suppression circuit above and will not be repeated here.

The field technician should know, specification or drawings of the logic control of the "high level" and "low level", "setting" and "reset", "and gate" and "or gate", "non-inverting input" and "inverting input" logic control can exchange each other or change, such as by adjusting the subsequent logic control and the implementation and the implementation of the same function or purpose.

The description and application of the present application herein is illustrative and is not intended to limit the scope of the present application to the above embodiments. The description of effects or advantages involved in the specification may not be reflected in actual experimental cases due to the uncertainty of specific condition parameters or other factors, and the description of effects or advantages shall not be used to limit the scope of the application. Variations and alterations of embodiments disclosed herein are possible and the substitutions and equivalent components of embodiments are known to those ordinary technicians in the field. It should be clear to those skilled in the field that the application may be realized in other forms, structures, arrangements, proportions, and with other components, materials and components, without deviating from the spirit or essential characteristics of the application. Other variations and alterations may be made to the embodiments disclosed herein without leaving the scope and spirit of the application

We claim:

1. A ripple suppression circuit for quasi-resonant flyback power supply, the ripple suppression circuit comprising:

a compensation circuit configured to generate a compensation signal, wherein the compensation signal is generated based on bus voltage; and a control circuit configured to compare a first signal with a second signal to provide a control signal, wherein the control signal is configured to control a power switch of the quasi-resonant flyback power supply turning from an on state to an off state, and the first signal is compensated by the compensation signal;

wherein the ripple suppression circuit further comprises a reference circuit, the reference circuit configured to generate a reference signal, the reference signal generated based on an output voltage of the quasi-resonant flyback power supply;

wherein the first signal represents sum of the reference signal and the compensation signal, and the second signal represents primary side current of a transformer of the quasi-resonant flyback power supply;

wherein the control circuit comprises:

an addition circuit having a first input terminal, a second input terminal and an output terminal, the first input terminal of the addition circuit coupled to the compensation circuit, the second input terminal of the addition circuit coupled to the reference circuit, the addition circuit configured to add the compensation signal and the reference signal to generate the first signal; and a comparison circuit having a first input terminal and a second input terminal, the first input terminal of the comparison circuit coupled to the second signal, the second input terminal of the comparison circuit coupled to the output terminal of the addition circuit;

when the second signal is greater than the first signal, the control circuit controls the power switch of the quasi-resonant flyback power supply turning from the on state to the off state; and wherein a relation between the compensation signal and the bus voltage is: CS_comp=K0+K1/Vbus; wherein CS_comp is the compensation signal, K0 is a constant, K1 is a non-zero constant, and Vbus is the bus voltage.

2. The ripple suppression circuit according to claim 1, wherein the ripple suppression circuit further comprises a first sampling circuit, the first sampling circuit configured to obtain a circuit signal representing the bus voltage.

3. The ripple suppression circuit according to claim 2, wherein the first sampling circuit comprises:

an auxiliary winding having a first terminal and a tail terminal, the tail terminal of the auxiliary winding coupled to a ground;

a third resistor having a first terminal and a second terminal, the first terminal of the third resistor coupled to the first terminal of the auxiliary winding;

a fourth resistor having a first terminal and a second terminal, the first terminal of the fourth resistor coupled to the second terminal of the third resistor, the second terminal of the fourth resistor coupled to the ground; and a current acquisition circuit having a first terminal and a second terminal, the first terminal of the current acquisition circuit coupled to the first terminal of the fourth resistor, the second terminal of the current acquisition circuit coupled to the ground; the current acquisition circuit configured to obtain a current signal representing the bus voltage by collecting a current flowing through the third resistor.

4. A ripple suppression method for quasi-resonant flyback power supply, the ripple suppression method comprising:

generating, using a compensation circuit, a compensation signal, wherein the compensation signal is generated based on bus voltage; and comparing, using a control circuit, a first signal with a second signal to provide a control signal, wherein the control signal is configured to control a power switch of the quasi-resonant flyback power supply turning from an on state to an off state, and the first signal is compensated by the compensation signal;

wherein the ripple suppression method further comprises generating, using a reference circuit, a reference signal, the reference signal generated based on an output voltage of the quasi-resonant flyback power supply;

wherein the first signal represents sum of the reference signal and the compensation signal, and the second signal represents primary side current of a transformer of the quasi-resonant flyback power supply;

wherein the control circuit comprises:

an addition circuit having a first input terminal, a second input terminal and an output terminal, the first input terminal of the addition circuit coupled to the compensation circuit, the second input terminal of the addition circuit coupled to the reference circuit, the addition circuit configured to add the compensation signal and the reference signal to generate the first signal; and a comparison circuit having a first input terminal and a second input terminal, the first input terminal of the comparison circuit coupled to the second signal, the second input terminal of the comparison circuit coupled to the output terminal of the addition circuit;

when the second signal is greater than the first signal, the control circuit controls the power switch of the quasi-resonant flyback power supply turning from the on state to the off state; and wherein a relation between the compensation signal and the bus voltage is: CS_comp=K0+K1/Vbus; wherein CS_comp is the compensation signal, K0 is a constant, K1 is a non-zero constant, and Vbus is the bus voltage.

* * * * *